March 7, 1933.  M. J. ANDERSON  1,900,150
CONVEYING SYSTEM
Filed Oct. 8, 1930   2 Sheets-Sheet 1

INVENTOR
MARTIN J. ANDERSON
By Paul, Paul & Moore
ATTORNEYS

March 7, 1933.    M. J. ANDERSON    1,900,150
CONVEYING SYSTEM
Filed Oct. 8, 1930    2 Sheets-Sheet 2
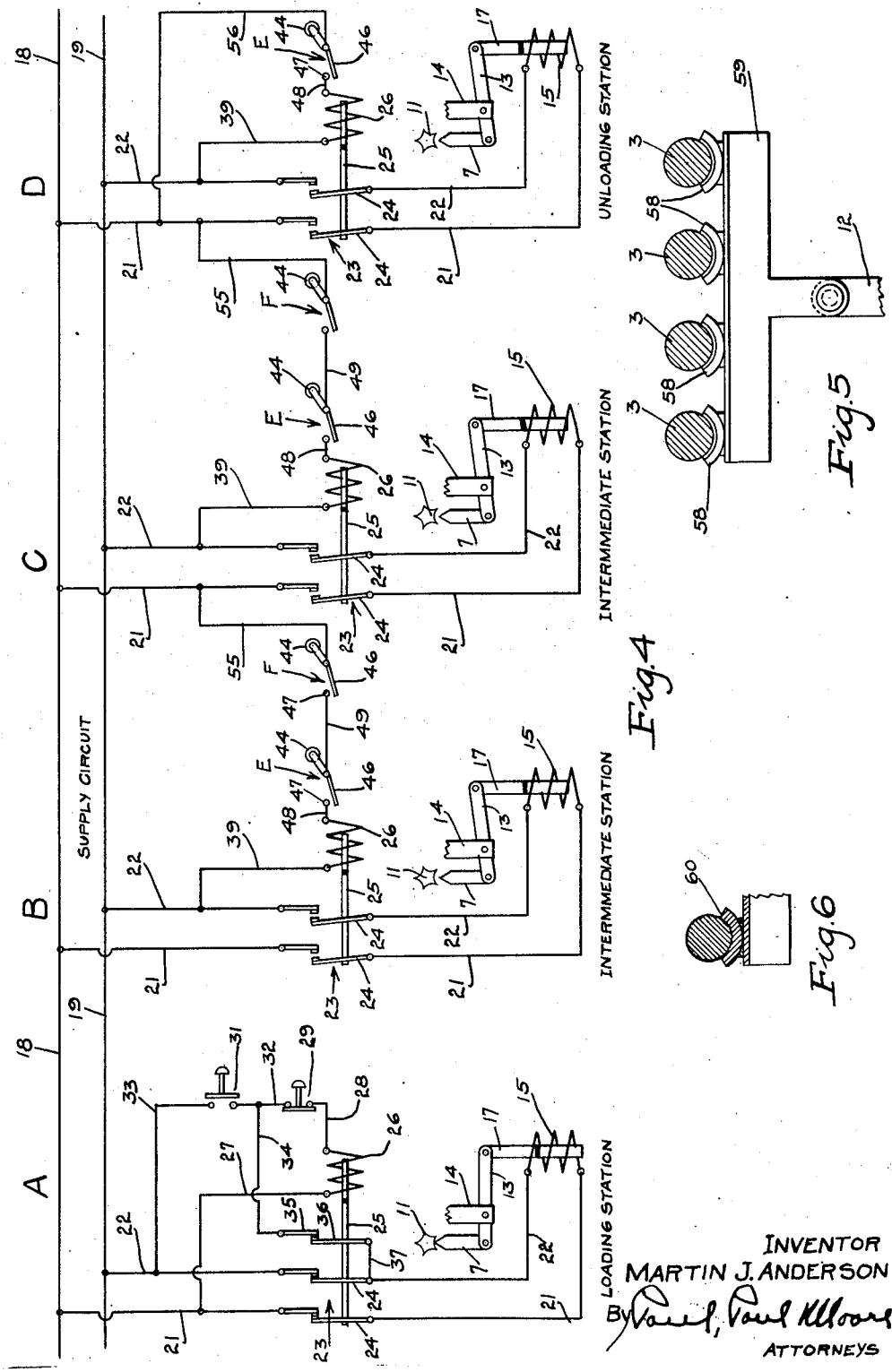
Fig.4
Fig.5
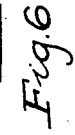
Fig.6
INVENTOR
MARTIN J. ANDERSON
ATTORNEYS Patented Mar. 7, 1933

1,900,150

UNITED STATES PATENT OFFICE

MARTIN J. ANDERSON, OF ELLWOOD CITY, PENNSYLVANIA, ASSIGNOR TO MATHEWS CONVEYER COMPANY, OF ELLWOOD CITY, PENNSYLVANIA, A CORPORATION OF PENNSYLVANIA

CONVEYING SYSTEM

Application filed October 8, 1930. Serial No. 487,230.

This invention relates to an improved conveying system adapted for transporting commodities from one place to another, and having means for controlling traveling movement of the commodities over the system.

An object of the invention is to provide a conveying system including a plurality of stations having means adapted to temporarily interrupt the travel of the commodities, as they pass thereover, to avoid congestion of the commodities at any point in the system.

A further object is to provide a conveying system including a loading station provided with means for temporarily retaining a commodity thereon, and an unloading station adapted to receive commodities from said loading station, and a stop means being interposed in the conveying system between said stations adapted to temporarily arrest the movement of a commodity traveling towards the unloading station, and means being provided at the unloading station for rendering said stop means inoperative whereby a commodity being held thereby is released and permitted to advance along the system towards the unloading station.

A further object is to provide a conveying system comprising a loading station, a plurality of intermediate stations, and an unloading station connected together by suitable conveyers whereby a commodity received at the loading station may be transported over the system to the unloading station and each station being provided with an electrically operated stop means adapted to cause a commodity to come to rest upon each intermediate station, in the event that a commodity or a load is reposing upon the unloading station, and the stop means at said stations being interconnected and adapted to automatically release the commodities temporarily being retained upon said stations, each time a commodity is removed from the unloading station, whereby the commodities being transported over the system may advance towards the unloading station.

Other objects reside in the specific construction of the stop means provided at each station adapted to interrupt rotation of the gravity rollers thereon; in the electrical means provided for actuating said stop means; in the means adapted to automatically control the operation of the stop means at the intermediate stations along the system, when an article is delivered onto and removed from the unloading station; and, in the simplicity of the apparatus as a whole.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 4 is a wiring diagram illustrating the electrical connections between the various stations included in the system;

Figure 5 is a view illustrating a modified form of brake mechanism; and

Figure 6 is a view illustrating a construction wherein the engaging surface of the rollers and brake elements are corrugated.

Figure 1:
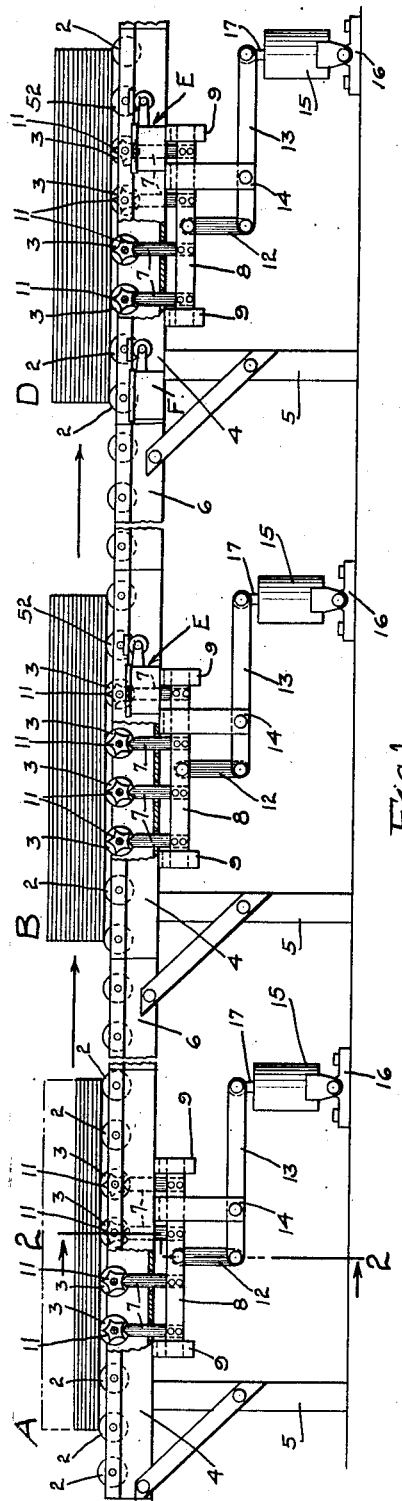
Figure 1 is a view showing a side elevation of a conveying system with the invention embodied in the construction thereof.
Figure 2:
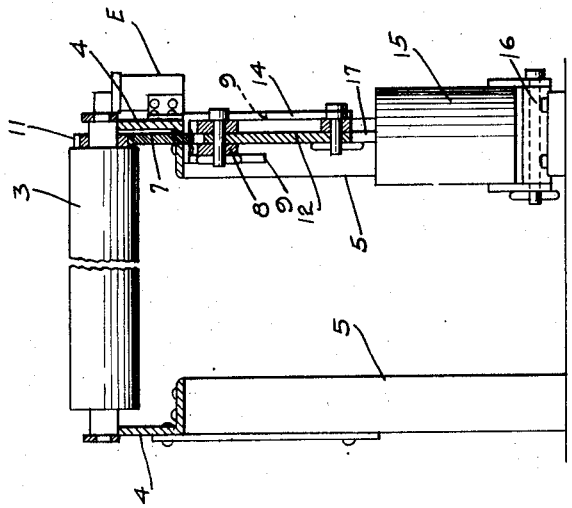
Figure 2 is a cross-sectional view on the line 2—2 of Figure 1.

In the selected embodiment of the invention here shown, there is illustrated in Figure 1, a conveying system shown provided with three stations; a loading station A, an intermediate station B, and an unloading station D. The loading and unloading stations are more or less essential to the system, but the number of intermediate stations employed may be varied, depending upon the installation.

As here shown, the loading station A comprises a plurality of conveyer rollers 2 and 3 supported in suitable anti-friction bearings mounted in side rails 4, shown supported upon suitable legs 5. The intermediate and unloading stations B and D, respectively, comprise similar rollers 2 and 3 supported in a manner similar to those of the loading station. Suitable conveyer sections 6, preferably of the gravity roller type, connect the stations together, as shown in Figure 1.

An important feature of this invention resides in the means provided for interrupting rotation of the station rollers 3 for the purpose of temporarily arresting traveling movement of commodities over the system. When the rollers 3 of a certain station are held against rotation, the commodity delivered onto that particular station will come to rest thereon and will be retained until the rollers are released, whereupon the commodity may advance along the system to the next station.

The means provided for thus interrupting rotation of the rollers 3 of each station, consists of a plurality of upright members 7 secured to suitable cross heads 8, mounted for sliding movement in suitable guides 9 secured to the side rails 4 of each station. As the roller stop means provided at each station are substantially alike in construction, but one will be described in detail.

The upper ends of the members 7 are preferably pointed or V-shaped, as shown, and are adapted to engage suitab'e star wheels 11 provided at one end of each roller 3. A link 12 connects the cross head 8 with one end of an arm 13 pivotally supported in a hanger 14 depending from one of the side beams 4 of the station. A solenoid 15 is pivotally mounted upon a bracket 16 and has an armature 17 movable therein, one end of which is connected with the arm 13. When this solenoid is energized, the armature 17 will oscillate the arm 13 in a direction to cause the upper terminals of the members 7 to move into locking engagement with the star wheels 11 and thereby prevent rotation of the rollers 3. When the solenoid 15 is deenergized, the members 7 will move out of locking engagement with the star wheels by the influence of gravity, or by the action of a suitable spring, not shown.

The winding of the solenoid 15 is electrically connected by conductors 18 and 19 of a main line or supply circuit, by means of wires 21 and 22, as shown in Figure 4. A suitable switch 23 is interposed in the circuit leading to the solenoid 15, and the movable contacts 24 of this switch are connected to one end of an actuator 25, the opposite end of which functions as an armature within a winding 26. One end of the winding 26 is shown connected by a wire 27 to the wire 21 of the solenoid circuit 15, and the opposite end of this winding has a wire 28 connecting it with one side of a control switch 29, here shown as being of the push button type. This switch is normally closed, as indicated.

A second control switch 31, also of the push button type, but which normally is in open position, has a wire 32 connecting one side thereof with the control switch 29 and the other side of the switch 31 is connected by a wire 33 to the wire 22.

When the control switch 31 is moved into circuit-closing position, current will flow from the main line conductor 19, through a portion of the wire 22, wire 33, switch 31, wire 32, switch 29, wire 28, solenoid 26, wires 27 and 21, and back to the main line conductor 18, thereby establishing a flow of current through the solenoid 26. Closing of the above described circuit will cause the actuator 25 to operate to move the contacts 24 into electrical engagement with their complementary fixed contacts, and thereby close the circuit to the solenoid 15, which will cause the arm 13 to be oscillated in a direction to move the members 7 into locking engagement with the star wheels 11 of the conveyor rollers 3, as shown in Figure 1. The switch 23 will be retained in closed position by means of a holding circuit composed of a wire 34 leading from the wire 32 to a fixed contact 35, adapted to be engaged by a movable contact 36 operatively connected with the actuator 25 and having a wire 37 connecting it with the wire 22 of the circuit of the solenoid 15.

When the loading station A is being loaded with a commodity, the solenoids 15 and 25 of said station will be energized to hold the members 7 in locking engagement with the star wheels of the rollers 3. When the station has been loaded, and it is desired to release the commodity supported thereon, the operator will actuate the starting switch 29, whereby the circuit to the solenoid 26 will be opened, and thereby cause the switch 23 to open and break the circuit to the solenoid 15, whereupon the members 7 will drop by gravity out of engagement with the star wheels 11 and thus release the rollers 3. When the rollers 3 at the loading station are thus released, the load may advance along the system to the next station.

Each intermediate station B is similarly provided with a solenoid 15 adapted to actuate its stop means, in a manner similar to that described with reference to the loading station. The solenoids at the intermediate stations are connected to the main line circuit by means of wires 21 and 22 having the switch 23 interposed therein, as shown. The solenoids 26 of the intermediate station are connected by wires 39 to the wires 22 of the circuits supplying current to the solenoids 15.

Figure 3:
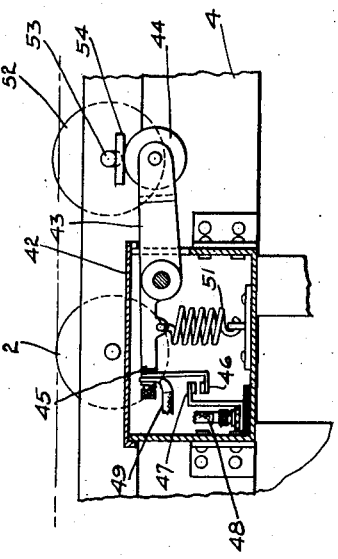
Figure 3 is an enlarged detail sectional view illustrating a form of switch used in connection with the stop means.

Suitable limit switches E, shown in detail in Figure 3, are used in connection with the intermediate stations. These switches are preferably alike in construction, and but one will be described in detail. Each limit switch E comprises a casing 42 having an arm 43 pivotally mounted therein and projecting outwardly therefrom, as shown in Figure 3, and supporting a roller 44 at the outer end thereof, as shown. An extension 45 is provided at the opposite end of the arm 44 and has a movable contact 46 supported thereon adapted to engage a fixed contact 47, having a wire 48 connecting it with one side of the winding of the solenoid 26 at station B. The movable contact 46 is connected by a wire 49 to the fixed contact 47 of a limit switch F similar in construction to the limit switch E, previously described. A spring 51 constantly tends to pull the extension 45 downwardly to move the contact out of electrical connection with the fixed contact 47.

Each intermediate station B and C is provided with a roller 52, one end of which is adapted for vertical movement with respect to the side rails 4. The axles 53 of the rollers 52 project through slots in the side rail 4 and are shown provided with bearing plates 54 secured thereto and adapted to engage their complemental rollers or wheels 44 provided upon the arms 43 of their complemental limit switches E. The springs 51 have sufficient strength to cause the arms 43 to lift one end of the rollers 52 so that they will project into the path of the commodities traveling over the conveyer system. When a commodity engages an elevated roller 52 at an intermediate station, it will be depressed, as shown in Figure 1, thereby causing its contact 46 to move into electrical connection with its complemental contact 47 and thus close the limit switch E at the first intermediate station.

If two or more intermediate stations are employed, each intermediate station following the intermediate station B, will be provided with an additional limit switch F, as indicated in Figure 4. The limit switch F is located in front of the station and has a wire 55 connecting the movable contact 46 thereof with the wire 21 connecting one side of the solenoid 15 of station C with the main line conductor 18. The unloading station D is similarly provided with two limit switches E and F, similar in construction to the limit switches used in connection with the intermediate station C. The movable contact 46 of the limit switch E of station D is connected by a wire 56 to the wire 21 of that station.

The novel conveying system featured in this invention is particularly adapted for use to transport heavy commodities such, for example, as metal plates from one station to another. By means of the improved stop means used in connection with each station, the commodities cannot become congested at the unloading station, in the event that the commodities are not removed therefrom.

In the operation of the system, the commodities, in the present instance, boiler plates, are delivered onto the loading station A and stacked one upon another. During the loading of the station, the rollers 3 will be held stationary by the action of the members 7 retained in operative position by the solenoid 15, because of the switch 23 being closed. As soon as the loading station A has been loaded, the operator will actuate the control switch button 29, breaking the circuit to the solenoid 26, whereupon said solenoid will become deenergized and permit the switch 23 to open. This switch may be opened by gravity or by means of a suitable spring, not shown. Upon opening of the switch 23, the cross head 8 will be lowered and move the members 7 out of locking engagement with the rollers 3, thereby permitting the load to advance along the conveying system in a direction towards the unloading station D.

The first load released from the loading station A will continue onward over the conveying system and will pass uninterruptedly through the intermediate stations B and C, until it reaches the unloading station D. When it reaches this station, it will depress the roller 52 of the limit switch E, thereby causing the solenoid 26 to become energized with the result that the switch 23 of the unloading station is moved into closed position, causing the solenoid 15 to become energized and move the stop members into locking engagement with the star wheels 11 of the rollers 3 of the unloading station. The load will thus come to rest upon the loading station, and will hold the limit switches E and F in circuit-closing positions.

The next load released from the loading station A will advance along the conveying system until it reaches the intermediate station C where it will come to rest. (See Fig. 4.) When it reaches this station, it will depress the roller 44 of limit switch E, thereby causing energization of the solenoid 26, and the subsequent energization of the solenoid 15 of this same station, which will cause the switch 23 to close in a manner similar to that described with reference to station D. Energization of the solenoid coil 15 of station C will cause the stop means of that station to be actuated to lock the conveyer rollers 3 against rotation, whereupon the load will come to rest, as shown in Figure 1. The load, being temporarily held on station C, will cause the limit switches E and F to be held in closed position, so that when the next load is released from the loading station A and it engages the limit switch E at station B, the stop mechanism of this station will be actuated and cause the load to come to rest on that station.

When the load supported upon the unloading station D is removed therefrom the limit switch F will automatically open, thereby breaking the circuit to the solenoid 26 of station C, resulting in the opening of the switch 23 of this station and the deenergization of the solenoid 15, whereupon the stop means at station C will become inoperative and permit the load or commodity temporarily being held thereon to advance towards the unloading station D.

As soon as the load at station C moves forwardly, the limit switch F at that station will open, causing the load at station B to advance to station C, after which the operator at station A may depress the switch 29 and release another load which will travel over the system until it reaches station B, where it will temporarily come to rest, if stations C and D are loaded.

From the foregoing, it will be understood, that it is practically impossible for the commodities to become congested at the unloading station, as the stop means provided at the intermediate stations will operate to temporarily hold the loads at these stations until the unloading station has been unloaded, whereupon the stop means at the intermediate stations will be actuated to automatically cause the release of the commodities or loads supported on these stations.

In Figure 1, I have shown an installation, embodying one intermediate station B, while in the wiring diagram, two intermediate stations B and C, are shown. It is to be understood that any desired number of intermediate stations may be employed in the system, and also that the distance between stations may be varied to suit conditions. The mechanism constituting the stop means for each station is very simple and inexpensive in construction and comprises few moving parts, whereby it may be manufactured at a comparatively low cost. The electrical appliances used are also of simple and inexpensive construction.

In some instances, it may be desirable to employ friction means for retarding rotation of the station rollers 3, instead of the star wheels 11 and members 7, and I have therefore illustrated in Figure 5, such a mechanism comprising a plurality of friction elements or brake shoes 58 adapted to frictionally engage the peripheries of the station rollers 3 to retard their rotation. The friction elements 58 may be supported upon a cross-head 59 adapted to be actuated in a manner similar to the cross-heads 8 supporting the members 7. If desired, the engaging surfaces of the station rollers 3 and friction elements 58 may be roughened or corrugated, as indicated at 60 in Figure 6.

I claim as my invention:

1. In a conveying system, a loading station having means whereby a commodity may be retained thereon, means for causing the release of a commodity from said loading station and permitting it to advance along the system, an unloading station connected with said loading station, an electrically controlled stop means adapted to interrupt the travel of a commodity between said stations, if the unloading station is loaded, and means made operable by removal of a commodity from said unloading station to render said stop means inoperative and cause the release of a commodity being held between said stations and permitting it to advance to the unloading station.

2. In a conveying system, a loading station having means whereby a commodity may be retained thereon, manually operable means for causing the release of a commodity from said loading station and permitting it to advance along the system, an unloading station connected with said loading system, an electrically controlled stop means in the conveying system between said stations adapted to temporarily interrupt the travel of a commodity in transit between said stations, if the unloading station is loaded, means at the unloading station for causing a commodity to come to rest thereon, and means automatically operable by removal of a commodity from said unloading station, to cause actuation of said stop means, whereby the commodity being held between said stations is released and permitted to advance to the unloading station.

3. In a conveying system, a loading station having means whereby a commodity may be temporarily retained thereon, means for causing the release of a commodity from said loading station and permitting it to advance along the system, an intermediate station adapted to receive a commodity from said loading station, an electrically controlled stop means adapted to cause a commodity to come to rest thereon, an unloading station adapted to receive a commodity from said intermediate station, and means at the unloading station made operable by removal of a commodity therefrom to cause actuation of said stop means and permit another commodity to advance to the unloading station.

4. In a conveying system, a loading station having means whereby a commodity may be retained thereon, means for causing the release of a commodity from said loading station and permitting it to advance along the system, an intermediate station adapted to receive a commodity from said loading station, an electrically operated stop means at the intermediate station adapted to cause a commodity to come to rest thereon, an unloading station adapted to receive a commodity from said intermediate station, means for causing each commodity to come to rest on said unloading station, and means connected with said stop means and made operable by removal of a commodity from the unloading station to cause actuation of said stop means whereby another commodity may advance to the unloading station.

5. In a conveying system, a loading station having means for retaining a commodity thereon, manually operable means for causing the release of the commodity from said loading station and permitting it to advance along the system, an intermediate station adapted to receive a commodity from said loading station, an unloading station connected with said intermediate station and adapted to receive a commodity therefrom, an electrically operated stop means interposed in the conveying system between said stations adapted to interrupt traveling movement of commodities over the system, and a control means for said stop means adapted to be actuated by a commodity delivered onto said unloading station, whereby said stop means may be rendered operable to arrest the movement of a commodity approaching the unloading station, and the removal of the commodity from said unloading station causing said control means to function and cause said stop means to be actuated to release the commodity being retained thereby, whereby the released commodity may advance to the unloading station.

6. In a conveying system, a loading station having means for temporarily retaining a commodity thereon, an intermediate station including a plurality of anti-friction rollers, electrically operated stop means for interrupting rotation of said rollers to cause a commodity to be temporarily retained upon said intermediate station, an unloading station, conveyors connecting together said stations, control means at the unloading station connected with said stop means and adapted to be made operable by movement of a commodity onto said unloading station to cause actuation of said stop means, whereby a commodity may come to rest on said intermediate station, and removal of a commodity from said unloading station causing said control means to be actuated to render said stop means inoperative, whereby a commodity being retained at the intermediate station is released and permitted to advance to the unloading station.

7. In a conveying system comprising a loading, and intermediate, and an unloading station, connected together by suitable conveyers, said loading and intermediate stations comprising a plurality of gravity rollers, an electrically operated stop means for interrupting rotation of the rollers of each of said stations, manually operable means for causing the release of the rollers of the loading station, whereby a commodity positioned thereon is permitted to advance to said intermediate station, means at the intermediate station adapted to be made operable by movement of a commodity thereover to cause actuation of its roller stop means, said means being arranged to function only in the event that a commodity is positioned upon the unloading station, means at said unloading station made operable by movement of an article delivered thereto to render the stop means at said intermediate station operable to arrest the movement of a commodity delivered thereto when a commodity is positioned on the unloading station, and means causing the stop means at said intermediate station to release the commodity retained thereon when a commodity is removed from the unloading station.

8. In a conveying system comprising a loading, an intermediate, and an unloading station, connected together by suitable conveyers, each station including a plurality of gravity rollers, an electrically operated stop means for interrupting rotation of the rollers of each station to cause a commodity to come to rest thereon, manually operable means at the loading station for causing the stop means at said station to become inoperative and permit a commodity positioned thereon to advance to the intermediate station, and the stop means at the intermediate and unloading stations being interconnected whereby, when said stations are empty and a commodity is released from the loading station, said commodity will pass over the intermediate station and come to rest upon the unloading station and the stop means at said intermediate station will be conditioned for operation so that when the next commodity is released from the loading station and reaches the intermediate station, it will cause the stop means at said station to become operable whereby the commodity will come to rest thereon, the stop means at said intermediate station remaining operative until the commodity positioned upon the unloading station is removed therefrom, whereupon the stop means at the intermediate station is rendered inoperative and the commodity retained thereon released and permitted to advance to the unloading station.

9. In a conveying system comprising a plurality of stations connected together by suitable conveyers whereby commodities may be conveyed from station to station over the system, an electrically operated stop mechanism at each station adapted to cause a commodity to come to rest at each station, said stop means being interconnected whereby when a commodity is removed from one of said stations, commodities being temporarily retained upon others of said stations will advance along the system to the next following stations.

10. In a conveying system, a plurality of stations each including a plurality of gravity rollers, stop means for interrupting rotation of the rollers at said stations to cause commodities delivered to said stations to come to rest thereon, solenoids for operating said roller stop means, and a switch for each solenoid adapted to be actuated by commodities traveling over the system, whereby said solenoids become energized and cause said stop means to be actuated and thereby temporarily stop said rollers and cause commodities to come to rest on said stations.

11. In a conveying system, comprising a plurality of stations connected together by suitable conveyors whereby a commodity may be conveyed from station to station over the system, each of said stations comprising a stop mechanism operable to cause a commodity to come to rest thereon, and each of said stop mechanisms being provided with a solenoid having a circuit connecting it with a supply circuit, an electrically operated switch interposed in each solenoid circuit, a limit switch at each station for controlling the operation of said electrically operated switches, each of said limit switches being adapted to be moved into circuit-closing position by a commodity moving onto a station, whereby the electrically operated switch associated with the station whose limit switch has been actuated, will be closed and cause the solenoid operatively connected with said actuated limit switch to become energized, whereby the stop mechanism associated with said solenoid will be operated to cause temporary interruption of travel of the commodity, said limit switches being interconnected and capable of causing a commodity to come to rest at each station, removal of a commodity from one of said stations causing the electrically operated solenoid switches to be automatically operated to cause commodities being retained upon others of said stations to move onward.

12. In a conveying system comprising a loading station, an intermediate station, and an unloading station, connected together by suitable conveyers whereby a commodity may be conveyed from station to station over the system, said intermediate and unloading stations each being provided with a stop mechanism capable of automatically causing a commodity to come to rest on each of said stations, a solenoid for operating each stop mechanism, a circuit connecting each solenoid with a supply circuit, a switch in each solenoid circuit, means for electrically operating the solenoid switch at the intermediate station, including a coil having a circuit connecting it with the main line circuit, normally open limit switches interposed in said coil circuit, one located at the intermediate station and one at the unloading station, and said switches being adapted to be actuated by commodities passing over the system whereby, when a commodity is delivered onto the unloading station, one of said limit switches will be closed so that when another commodity moves onto the intermediate station, the limit switch at that station will be actuated to complete the closing of the circuit to the switch operating coil, whereupon the stop means at the intermediate station will be operated to automatically cause a commodity to come to rest thereon.

13. In a conveying system comprising a loading station, an intermediate station, and an unloading station, connected together by suitable conveyers whereby a commodity may be conveyed from station to station over the system, said intermediate and unloading stations each being provided with a stop mechanism capable of automatically causing a commodity to come to rest on each of said stations, a solenoid for operating each stop mechanism, a circuit connecting each solenoid with a supply circuit, a switch in each solenoid circuit, means for electrically operating the solenoid switch at the intermediate station, including a coil having a circuit connecting it with the main line circuit, normally open limit switches interposed in said coil circuit, one located at the intermediate station and one at the unloading station, and said switches being adapted to be actuated by commodities passing over the system whereby, when a commodity is delivered onto the unloading station, one of said limit switches will be closed so that when another commodity moves onto the intermediate station, the limit switch at that station will be actuated to complete the closing of the circuit to the switch operating coil, whereupon the stop means at the intermediate station will be operated to automatically cause a commodity to come to rest thereon, and removal of a commodity from the unloading station causing the limit switch associated therewith to move into circuit-opening position, whereby the stop mechanism at the intermediate station will be rendered inoperative and permit the commodity to be retained thereon to move on.

14. A conveying system comprising a loading station, a plurality of intermediate stations, and an unloading station, an electrically operated stop means at each station, said stop means having switches positioned to be actuated by commodities traveling over the system, said switches being so interconnected that a commodity released from the loading station, when the system is empty, will travel uninterruptedly over the system to the unloading station, and succeeding commodities released from the loading station, when a commodity is positioned on the unloading station, will cause actuation of said switches and automatically cause following commodities to come to rest on said intermediate stations, whereon they will be temporarily retained until the unloading station is relieved of its load, whereupon said stop means will become inoperative and permit commodities retained on said intermediate stations to advance over the system towards the unloading system.

15. A conveying system comprising a plurality of stations, a stop means at each station, and a control member disposed at each station and adapted to be actuated by commodities delivered to said stations, said control members being interconnected with said stop means whereby, when a commodity is brought to rest on one of said stations, it will actuate the control member at said station and cause the control member at a preceding station to be conditioned for operation whereby a following commodity delivered to the station whose control member has previously been conditioned for operation, will be actuated and cause the stop means at that station to become effective.

16. In a conveying system, a plurality of separate stations connected together by suitable conveyers whereby commodities may be conveyed from station to station over the system, retaining means at said stations adapted to cause commodities to come to rest thereon, control means for said retaining means arranged to be actuated by commodities passing over said stations, and means made operable by removal of a commodity from one of said stations to effect the release of other commodities being temporarily retained upon others of said stations.

17. In a conveying system, a plurality of separate stations connected together by suitable conveyers whereby commodities may be conveyed from station to station over the system, retaining means at said stations adapted to cause commodities to come to rest thereon, control means for said retaining means arranged to be actuated by commodities passing over said stations, and means interconnecting said control means whereby when a commodity is removed from one of said stations, commodities being temporarily retained upon others of said stations will advance along the system.

18. In a conveying system comprising a plurality of separate stations connected together by suitable conveyers whereby commodities may be conveyed from station to station over the system, retaining means at said stations adapted to cause commodities to come to rest thereon, control means for said retaining means comprising members adapted to be actuated by the passage of commodities over said stations, means interconnecting said control means, and the members of said control means being so positioned with respect to one another that when the system is empty, and a commodity is started over the system, said commodity will pass uninterruptedly over the system and will come to rest on the last station, and other commodities started over the system will automatically come to rest upon other stations along the line.

19. In a conveying system, a loading station, means for causing the release of a commodity from said loading station, an intermediate station situated remote from said loading station, means connecting said intermediate station with said loading station, an unloading station situated remote from said intermediate station and connected therewith whereby it may receive commodities therefrom, retaining means at said intermediate and unloading stations adapted to temporarily interrupt the travel of commodities over said stations, a control means for each retaining means, and means interconnecting said control means whereby when a commodity is removed from the unloading station, a commodity temporarily being retained upon said intermediate station will advance to the unloading station.

20. In a conveying system, a loading station, an intermediate station situated remote from said loading station, a conveyer connecting said intermediate station with said loading station, an unloading station situated remote from the intermediate station and having a conveyer connecting it therewith whereby commodities may travel from the loading to the unloading station, retaining means at said intermediate and unloading stations adapted to cause commodities to come to rest thereon, interconnected control means for said retaining means comprising members adapted to be actuated by the passage of commodities over said stations, said members being so positioned that when a commodity is released from the loading station, it will travel uninterruptedly over the system to the unloading station, and a following commodity released from the loading station will be retained upon said intermediate station until the commodity upon the unloading station is removed therefrom, whereupon the control means will be actuated to release the commodity being retained at the intermediate station.

In witness whereof, I have hereunto set my hand this 1st day of October, 1930.

MARTIN J. ANDERSON.